May 23, 1961 H. LANDERER ET AL 2,985,371

MOVING AVERAGE COMPUTER

Filed March 30, 1955 3 Sheets-Sheet 1

INVENTORS
RICHARD RABIN
HUGO LANDERER
BY Victor D. Borst
ATTORNEY 2,985,371
Patented May 23, 1961

1

2,985,371

MOVING AVERAGE COMPUTER

Hugo Landerer, Brooklyn, and Richard Rabin, Forest Hills, N.Y., assignors to Sperry Rand Corporation, a corporation of Delaware Filed Mar. 30, 1955, Ser. No. 497,844

7 Claims. (Cl. 235—180)

Figure 1:
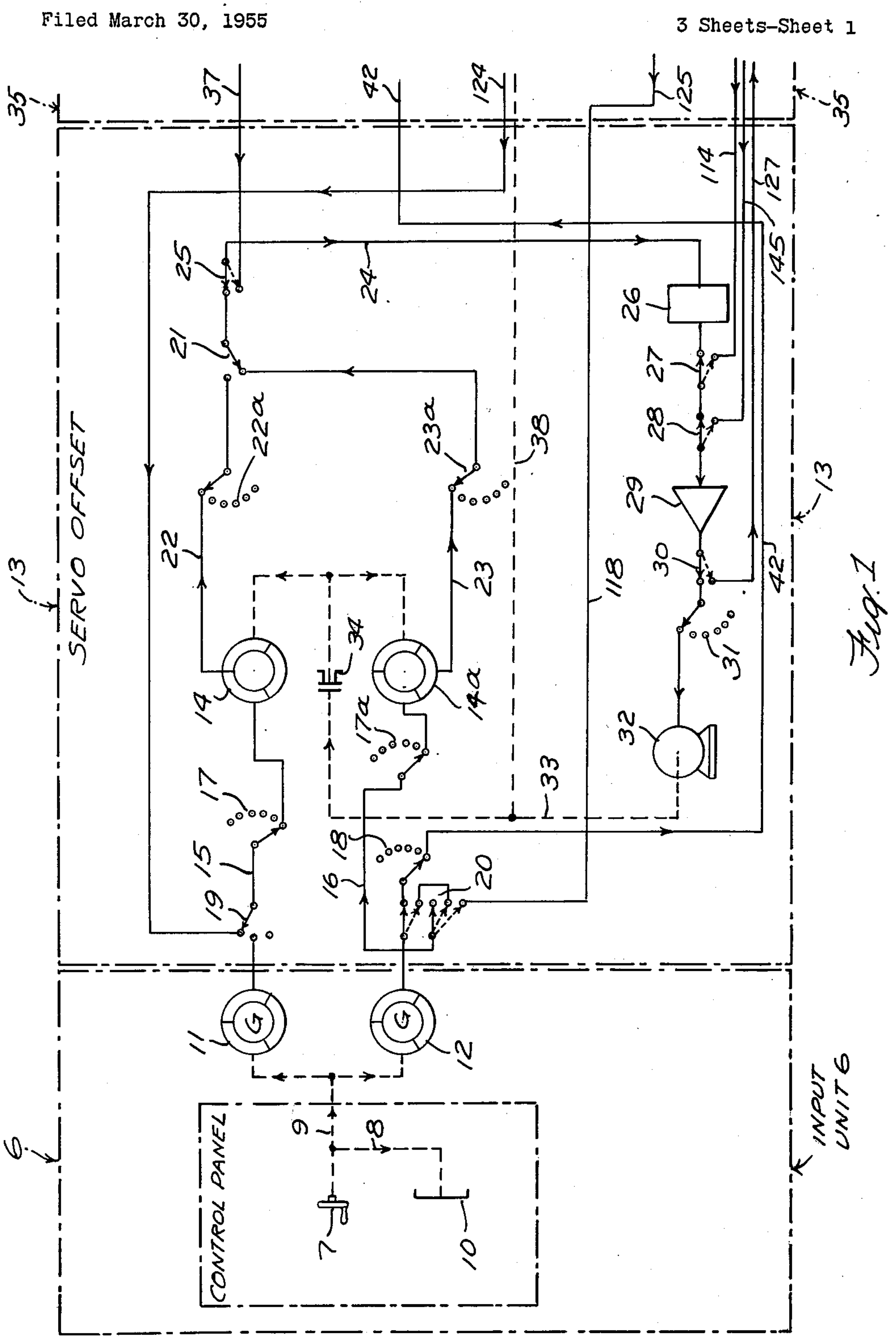

This invention relates to a computer which has for its general purpose the mathematical determination of an average for a set of known incremental values. Secondarily, the computer has means for the separate removal of the individual increments which confers on the computing device a particular capability for the calculation of a moving average.

An object of the invention is to provide a computer which yields a highly accurate determination of an average for a plurality of increments.

Another object of the invention is to provide an averaging computer which is capable of performing its computations for any desired number of values not exceeding a prescribed maximum which has been found in practice to be sufficient to meet exacting requirements in the art of target tracking and identification.

Another object of the invention is to provide a computer which furnishes a known set of multiplying factors required by the mathematical formulations to each of the increments to be averaged by the use of a single network box and hence substantially reduces the cumbersomeness of the equipment and the number of units required for the calculations.

Still another object is the provision of a flexible and efficient means for the computing of a moving average for a set of increments some of which have been substituted for initial values.

Other objects will appear in the text of the detailed description of the computing device as well as in the general explanation which follows:

It has hitherto been found necessary in the computer art to provide but a single unit which is normally a potentiometer for the storing of known values to be subsequently averaged. The obvious disadvantage of such a provision has been the sacrifice of accuracy because of reduction in scale factor. This computer increases accuracy by increasing the scale by which the supplied increments are compared. The most efficient expedient found to accomplish this highly desirable purpose is the provision of separate potentiometers for storing each increment. A single storing unit frequently fixes the number of incremental values required to achieve the arithmetical result. Employing separate storing units makes it possible to set in a variable number of inputs which is an advantage sometimes dictated by the conditions for radar tracking and the limited time available to obtain the intelligence such means afford.

The employment of an equal number of storing units for each known input does however have the concomitant disadvantage of multiplying the number of units which, if a corresponding number of factoring units were found necessary, would uneconomically increase the size and weight of the equipment and render its operation impracticable. Accordingly, there is provided a standard network box having a separate resistive leg for each storing unit or potentiometer. The output of the network box is an aggregate of the increments multiplied by the

2 particular factors required by the formulation. The legs of the network box are selectively connected to each potentiometer by means of a rotary switch of conventional design. It is thus possible to drop any number of the initial increments, substitute new values therefor and insure that the new set of increments will be multiplied by the proper factors since the rotary switch is capable of disconnecting the potentiometers from the network box and connecting the several potentiometers to different legs in the network box. The attainment of this so-called moving average is achieved simply and without the need of units other than those required to average the initial values.

The system employs the conventional servo systems for the accurate introduction of the increments to the storing units and the averaged values to the indicators. These systems contemplate the use of dual or double speed servo systems to increase accuracy in the mechanical stage of their operations.

Figure 2:
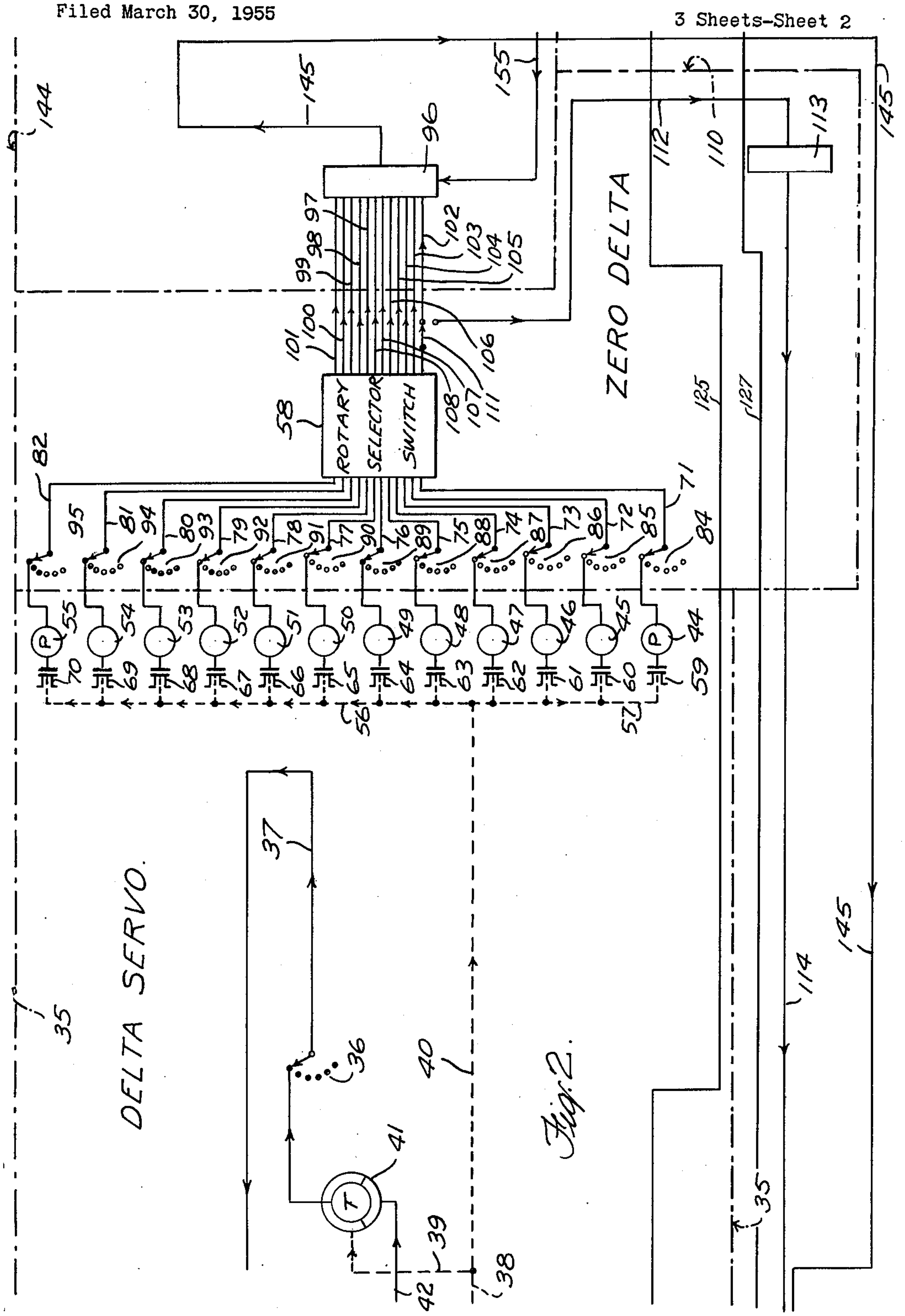
Figure 3:
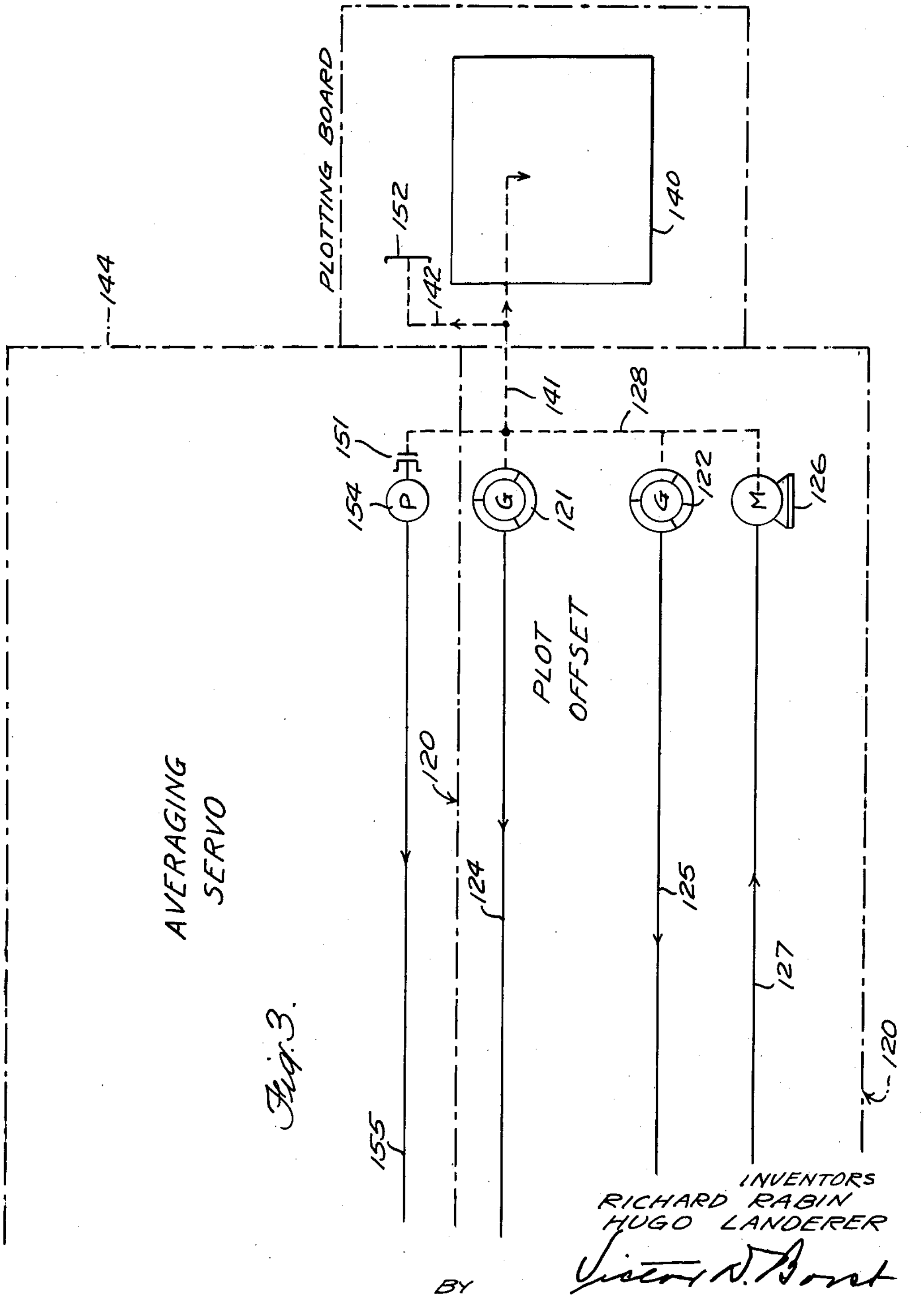

The details of the invention will be more readily understood from the following description when taken in conjunction with the drawings, in which Fig. 1 is a schematic of the input phase of the computer;

Fig. 2 is a schematic of the storing units for the increments showing the selective means for introducing the multipliers and servo means to zero the units; and Fig. 3 is a schematic showing of the servo systems and connections therefor which are employed to average the network output and introduce the same and the offset to the output.

The dotted lines in the drawings indicate mechanical connections whereas the continuous lines indicate electrical connections between the units.

The formula which is mechanized by the averaging computer is shown as follows:

(1)

$$13X\text{ avg}=K+(K+\Delta X_1)+(K+\Delta X_1+\Delta X_2)+(K+\Delta X_1+\Delta X_2+\Delta X_3)+\ .\ .\ .\ +(K+\Delta X_1+\Delta X_2+\ .\ .\ .\ +\Delta X_{12})$$

or (2)

$$X\text{ avg}=\frac{13K+12\Delta X_1+11\Delta X_2+10\Delta X_3+.\ .\ .+\Delta X_{12}}{13}$$

where K is the initial offset position from the assumed point of reference for the target and X is the initial incremental distance therefrom. The subscripts indicate successive increments of distance. In another form the equation may be expressed.

(3) $$X\text{ avg}=K+\frac{1}{13}\sum_{n=1}^{n=12}(13-n)\Delta X_n$$

where $n$ is the number of factors averaged.

The description will refer to the X coordinate only but it is understood the mechanism is the same for the Y coordinate, the operation being repeated to determine the predicted position of the target.

Referring to the drawings the numeral 6 is an input unit into which the incremental values are introduced. It is expected that the increments will be predetermined by means of radar or other visual means capable of receiving positional intelligence. On the control panel of the input unit is a manual hand crank 7 in driving connection by means of shafts 8 and 9 with a dial indicator 10 and fine and coarse synchro generators 12 and 11, respectively, of offset servo system 13. The output sides of synchro generators 11 and 12 are connected to double speed transformers 14 and 14a by lines 15 and 16. Target selector switch 17 and double throw switch 19, and target selector switch 17*a* and multiple throw switch 20, are inserted in lines 15 and 16 respectively. The connections are shown for the first target only but the target selector switches are disclosed in order to show where they should be placed for the additional and identical circuitry necessary if the computer is to furnish positioning information on more than one target.

The servo offset system 13 comprises a switch 21 connecting branches 22 and 23 to line 24 in which there is inserted a referencing switch 25, servo control 26, zeroing switch 27, averaging switch 28, servo amplifier 29, plot off-set switch 30, target selector switch 31 and a servo motor 32, the mechanical output of which is connected to the control transformers 14 and 14*a* by a feedback shaft 33 through a clutch 34. Target selector switches 22*a* and 23*a* are in branches 22 and 23, respectively. The switch 21 enables the operator to servo successively the transformer 14 to the coarse synchro generator 11 and transformer 14*a* to the fine synchro generator 12. Double throw switch 19 in line 15, multiple throw switch 20 in line 16 and the solenoid operated clutch 34 make it possible to store the initial value for offset K in the servo offset system 13 while the increments are servoed to the several potentiometers as explained below.

The synchro generator 12 is also connected to control transformer 41 (Fig. 2) through the multiple throw switch 20, target selector switch 18 and line 42. Control transformer 41 is one element of delta servo system 35 into which the incremental inputs are set while being placed in the separate storing units. The electrical output of control transformer 41 is connected to target selector switch 36 and referencing switch 25 by line 37, thence to servo control unit 26, amplifier 29 and motor 32. The mechanical output of motor 32 is connected by feedback shaft 33 and shafts 38 and 39 to the input side of the transformer 41. When the output of the transformer is completely converted to mechanical movement in the shafts, the transformer will be shut off and shaft 40, which connects shaft 38 with the storing units for the increments, will have accurately reproduced the electrical value originally placed in the input unit 6.

The storing units consist of a bank of separate potentiometers 44, 45, 46, 47, 48, 49, 50, 51, 52, 53, 54 and 55 which individually and sequentially store the incremental distances as they are placed into the input unit. Shafts 56 and 57 connect the potentiometers sequentially by means of a rotary selector switch 58 which selectively controls the operation of clutches 59, 60, 61, 62, 63, 64, 65, 66, 67, 68, 69 and 70 which connect the rotative elements of their respective potentiometers to the input stages of the computer. The potentiometer outputs are connected to the rotary selector switch 58 by leads 71 through 82 inclusive, there being inserted in each lead a target selector switch 84 through 95 inclusive. The terminals on the opposite side of the rotary selector switch are connected to resistive legs in network box 96 by means of leads 97 through 108 inclusive. The resistance of each leg is proportional to the multiplying factors for the increments i.e., 12 through 1 in Formula 2. The rotary selector switch is capable of connecting the resistive legs in the network box to one of a number of potentiometers so that the outputs of each may be multiplied by a number of the different multipliers as desired.

For example, in order to compute a moving average it is necessary to remove the increment from the potentiometer having a multiplying factor of 12 so that another may be substituted therefor. Employed as such it is necessary to vary the sequence of operations in the computer and multiply the potentiometer outputs by different factors. Thus if the potentiometer 55 is zeroed the incremental value appearing on potentiometer 54 would then be multiplied by 12 in accordance with Formula 2. The other increments would accordingly be multiplied by a unit factor higher than for the original set of increments. The rotary switch permits this type of moving computation due to the alterable connections provided between the resistive legs of the network box and potentiometers.

The required zeroing of one of the potentiometers is accomplished by the zero delta servo system 110 which is connected to lead 102 between the rotary selector switch and the network box by a switch 111 and line 112. A servo control and network box 113 is connected by line 114 to zeroing switch 27, servo amplifier 29, target selector switch 31 and motor 32, which together with shafts 33, 38, 40 and 56 or 57 comprise a servo system. When switch 111 is closed the electrical output on the potentiometer which has been connected to the swich 111 by the rotary selector switch 58 and which represents the potentiometer being multiplied twelve times, is converted to mechanical movement on shafts 56 or 57 by the servo system 110 to remove the incremental value represented thereon.

A plot offset servo system 120 (Fig. 3) includes the double speed control transformers 14 and 14*a* which are connected to synchro generators 121 and 122 respectively by lines 124 and 125 and switches 19 and 20. All of the units of servo system 13 save motor 32, for which motor 126 is substituted, are employed for servoing the offset value stored on transformers 14 and 14*a* onto generators 121 and 122. The motor 126 is connected to amplifier 29 by plot off-set switch 30 and line 127. The mechanical output of motor 126 is placed in double speed synchro generators 121 and 122 by shaft 128. The output of the generators is fed back to nullify the set-in values of the transformers 14 and 14*a* through lines 124 and 125. When the transformers have been thus shut down, the value represented by the turning of shaft 128 accurately reproduces the stored value in the off-set servo system 13 and drives shaft 141 which is in driving engagement with shaft 128. This value is then introduced to the plotting board 140 by driven shaft 141 and to a dial 152 by shaft 142 which is in engagement therewith.

The output of network box 96 is proportional to $$\sum_{n=1}^{n=12} (13-n)\Delta X_n$$

The mechanical equivalent of this value is produced in averaging servo system 144. This servo system comprises a network box and servo control output line 145 having inserted therein in series an averaging increment switch 28, the servo amplifier 29, switch 30 and the motor 126 in line 127. The mechanical output of motor 126 is placed on shafts 128, 141 and 142. A clutch 151 is connected off shaft 128 and is adapted to drive the mechanical input side of averaging potentiometer 154 which is electrically connected to the network box 96 by line 155.

The gearing ratio in the averaging servo system introduces the desired divisor factor which will be 1/13 when the averaging is taken over a range of twelve increments. As indicated in Formula 3, the value represented by the shaft of the potentiometer 154 after all the sequencing steps have been performed and the total number of inputs are introduced to the network box 96 will be $$1/13 \sum_{n=1}^{n=12} (13-n)\Delta X_n$$

Since this value along with the offset value K is placed on shaft 141, Formula 3 is satisfied.

The various clutches and switches are important in that they permit the proper sequence of steps to occur in the different stages of the computer. They may of course be operated manually or may be actuated automatically and in sequence by a relay sequencing system which senses the completion of the individual steps and initiates the succeeding ones. The increments and the constant offset values are placed in the storing units and servo offset systems respectively and removed therefrom and placed in the indicators by servo systems which automatically shut down after completion of their assigned function. Initiation of the next step by non-automatic means is therefore feasible although admittedly accompanied by some time delay.

The operation of the computer in the proper sequence is important to understand and will therefore be described. The switches 19 and 20 are first positioned to connect the servo offset system 13 to the synchro generators 11 and 12 and clutch 34 is made. Offset value K is cranked into the coarse synchro 11 and the fine synchro 12 from the control panel and servoed onto the transformers 14 and 14*a* by successively connecting them to the servo units by means of switch 21. The offset is thus stored while the increments are being placed into the individual potentiometers.

Next the computer is readied to receive the first increment. The rotary switch is set to connect potentiometer 44 to switch 111 which is positioned to connect in the zero delta servo system 110. At the same time clutch 34 is broken so as not to disturb the offset value stored on the transformers 14 and 14*a* and switch 27 is positioned to connect the amplifier 29 and motor 32 into the zero delta circuit. Clutch 59 is made and drives the potentiometer 44 in accordance with the output of motor 32. The output drives the clutch as long as there is any signal on the potentiometer and ceases to drive when the potentiometer has been discharged or zeroed.

Then the control transformer 41 is referenced to the fine synchro generator 12 through the multiple throw switch 20. The clutch 59 is first broken, switch 27 is positioned again to connect the servo control unit 26 to the amplifier 29 and switch 25 is positioned to connect the transformer 41 to the fine synchro generator 12 which drives the transformer to its position. The rotary selector switch is then energized so as to connect line 71 to line 102 and line 72 to line 103, line 73 to line 104, etc.

The computer is then reset and is ready to receive the first increment. The engagement of clutch 59 and potentiometer 44, which was previously zeroed, is made. When the first increment is cranked into the fine synchro generator 12, the control transformer 41 references itself to it and at the same time positions the potentiometer 44 to the incremental value. When the generator and control transformer are again referenced, the value has been accurately set into the potentiometer and the system shuts off.

The potentiometer 45 is then zeroed and the control transformer 41 is referenced to the synchro generator 12 which was made necessary by the previous zeroing operation which set the transformer by whatever charge that was taken off the potentiometer. The computer is then reset and the second increment is placed into potentiometer 45. The remaining increments are then set into the rest of the potentiometers, the zeroing and referencing steps being repeated before each introduction. It is of course not necessary to fill all the potentiometers but as many may be used as desired.

The averaging potentiometer 154 is then zeroed by making clutch 151 and positioning the averaging increment switch 28 which is thrown to connect the network box and servo control 96 to the servo amplifier 29, as is switch 30 to connect motor 126 to amplifier 29. The signal on the averaging potentiometer is then zeroed using the following servo loop, potentiometer 154, network box 96, amplifier 29, and motor 126. The signal of the potentiometer 154 is compared to ground in network box and potentiometer servo control 96.

The offset value initially stored on the control transformers is servoed to the synchro generators in the plot offset servo system 120 by positioning switches 19 and 20, to connect these units and switch 30 to connect the servo control unit 26 and the servo amplifier 29 to the motor 126. The offset value will appear on the dials which furnish a total average. Clutch 34 is not made at this particular instant.

The averaging operation is carried out as follows: Network box and servo control 96 is connected to amplifier 29 through switch 28. Switch 30 is thrown to connect motor 126 to potentiometer 154. Clutch 151 is made and averaging potentiometer is servoed to the signal on line 145. Since the offset value has already been servoed, this will add the average of the incremental outputs and thus satisfy the formula as a complete average.

To obtain a moving average it is necessary to zero the first potentiometer 44, keeping clutch 34 made and the offset systems connected so as to obtain a new offset value at the same time. The switches 27, 58 and 111 and clutch 59 are adjusted as before and using the following servo loop: potentiometer 44, servo control 113, amplifier 29 and motor 32. The potentiometer is zeroed. After completion of above operation, the transformer 41 is referenced to generator 12 as described above. A new increment is then introduced to potentiometer 44 and a new average is obtained by servoing the network box output to the output indicator in servo system 144. A moving average may be obtained with any number of substituted increments for initial values by following out these same steps and setting the new increments into the previously zeroed potentiometers.

Any number of incremental values may be averaged by either adding or removing the separate potentiometers and changing the number of legs in the network box to correspond to the new number of potentiometers. Also the number of increments removed for which new ones are added can be changed by changing the sequencing action of the computer. It is understood that the invention consists of the relative arrangement of the servo systems and the servo connections and units which enable the desired sequencing rather than such devices as may be required for a completely automatic performance of the several steps. The scope of the invention is therefore to be construed only in accordance with the following claims.

What is claimed is:

1. An averaging computer for determining the average of a plurality of incremental values and a moving average for a plurality of incremental values some of which may be the same as the initial increments comprising a plurality of separate potentiometers for storing each of said incremental values, means for sequentially introducing said values into said storing potentiometers, an averaging servo system into which the increments stored on said storing potentiometers are selectively introduced, said servo system having an averaging potentiometer and a predetermined gearing ratio for furnishing a common factor for said increments, a network box in said averaging servo system being connected to said averaging potentiometer and comprising a plurality of resistive legs, a rotary switch selectively connecting each of said potentiometers to one of the resistive legs of said network box, a dial indicator, a plot offset servo system interposed between said network box and said dial indicator through which data is imparted to said dial indicator, and a zero delta servo system selectively connected to the output of said separate storing potentiometers and said averaging potentiometer through said rotary switch the output of said zero delta servo system being connected to the input side of said storing potentiometers, said zero delta servo system being thereby adapted to remove sequentially the incremental values appearing on said storing potentiometers.

2. A computer as claimed in claim 1, wherein the means for sequentially introducing the incremental inputs to the potentiometers include individual clutches for each potentiometer, a delta servo system, the mechanical output of which is in driving connection with each of said clutches, and an input unit electrically connected to the delta servo system for successively introducing the incremental values thereto.

3. A computer as claimed in claim 1 wherein said means for setting a constant into said plot offset servo system is a servo offset system, said servo offset system having storing means selectively connected to said plot offset servo system and zero delta servo system whereby a new offset value may be set into the plot offset system by zeroing one of the potentiometers.

4. A computer for determining the average of a plurality of incremental values comprising a plurality of separate potentiometers for storing each of said incremental values, means for sequentially introducing said values into said storing potentiometers, an averaging servo system into which the increments stored on said storing potentiometers are selectively introduced, said averaging servo system having an averaging potentiometer and a predetermined gearing ratio for furnishing a common factor for said increments, servo loop means selectively connected to each of said storing potentiometers and to said averaging potentiometer for zeroing the said storing potentiometers, a network box in said averaging servo system connected to said averaging potentiometer and comprising a plurality of resistive legs, a rotary switch selectively connecting each of said potentiometers to one of the resistive legs of said network box, a dial indicator, a plot offset servo system interposed between said network box and said dial indicator through which data is imparted to said dial indicator, and means for setting a constant into said plot offset servo system.

5. A computer as claimed in claim 4 wherein the means for selectively introducing the increments stored on said potentiometers into the averaging servo system comprises a said rotary switch the output of which is connected directly to the individual legs in the network box in the averaging servo system and the input of which is adapted to contact selectively each of said potentiometers and hence connect any one of the potentiometers to any of said resistive legs in the network box.

6. A computer as claimed in claim 4 wherein the means for introducing the increments into the separate potentiometers comprise an input unit, clutches severally engageable with each potentiometer, and means for servoing the increments from the input unit to said clutches.

7. A computer as claimed in claim 4 wherein said zeroing means includes a servo system selectively connected to the potentiometers by said rotary switch.

References Cited in the file of this patent

UNITED STATES PATENTS 2,713,457 Bubb ---------------- July 19, 1955

OTHER REFERENCES

"Analog Methods in Computation and Simulation" (Soroka), published by McGraw-Hill 1954 (pp. 109 relied on).